United States Patent Office 2,788,336
Patented Apr. 9, 1957

2,788,336

CARBOXYMETHYL PROTEIN AS A STABILIZER FOR A BUTADIENE-STYRENE LATEX EMULSION PAINT

Eugene Henry Uhing and Leonard L. McKinney, Peoria, Ill., assignors to the United States of America as represented by the Secretary of Agriculture No Drawing. Application August 29, 1952,
Serial No. 307,183

1 Claim. (Cl. 260—8)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to certain uses of the reaction products of proteins and degraded proteins with carboxymethylating agents such as chloroacetic acid.

Natural proteins, such as the globulins of soybeans, peanuts and cottonseed and the phosphoproteins such as casein, have potential uses as adhesives, textile assistants and emulsion stabilizers. Protein emulsion stabilizers have been used in various compositions, such as water-emulsion paints, wax emulsions, printing pastes, paper-coating emulsions, leather dressings, agricultural spray emulsions, asphalt emulsions, polish emulsions, and emulsions used in the textile industry.

One of the serious limitations of plant globulins for industrial uses stems from their limited dispersibility on water at a neutral pH. Alkalies are usually required to disperse these proteins giving a dispersion of pH 9 to 11 and thus their use has been limited to applications where alkali may be tolerated. One method of partially overcoming this limitation is to subject the plant globulin to a mild hydrolytic treatment with alkali. This breaks alkali-labile linkages, lowers the molecular weight, and allows dispersion at relatively lower pH values. With such degraded globulins, it is possible to use the weaker bases, such as ammonia, sodium carbonate, and borax to produce dispersions of pH 7.5 to 9.0.

Another limitation to the industrial application of proteins is their susceptibility to attack by putrefying microorganisms. Thus, although proteins have proved to be excellent stabilizers for emulsions, microorganisms frequently attack and destroy the protein while stored in containers, and as a result, the inherent instability of the emulsion develops. The same effect is encountered when natural enzymes that are associated with many proteins cause them to deteriorate. Coatings made from such emulsions are subject to rot because of various biological factors which disintegrate the protein content of the coating or induce the growth and spread of microorganisms.

It is customary to add preservatives to emulsions containing protein-substances to inhibit the attack of microorganisms, but heretofore, attempts to preserve these compositions have not proved satisfactory. Many effective preservatives present a health hazard while others are only partially effective unless used in excessive amounts. Moreover, aldehydes, such as formaldehyde, which are among the most effective preservatives, react with proteins to produce a cross-linked polymer, resulting in gelation, and are not tolerated in such emulsions.

In accordance with the present invention the derivatives of proteins or protein materials are formed by the reaction of proteins, such as soybean protein or soybean meal, peanut protein, cottonseed protein, casein and the like or the mildly hydrolyzed proteins mentioned above, with a carboxymethylating agent to provide carboxymethylated products which may be dispersed in water at a neutral or slightly acidic pH range, and which are resistant to putrifying microorganisms, which are tolerant to formaldehyde, and which retain substantially all of the desirable characteristics of proteins as emulsifying agents and as warp-sizing agents for the textile industry.

The carboxymethylated protein derivatives are obtained by reacting proteins or slightly degraded proteins under alkaline conditions with a carboxymethylating agent such as chloroacetic acid. For example, chloroacetic acid reacts readily with proteins under alkaline conditions, pH 8 to 12, at elevated temperature, 40° C. to 90° C., the amount of carboxymethyl groups formed being somewhat dependent upon the amount of chloroacetic acid employed. In general, 5 to 30 percent chloroacetic acid based on the weight of the protein can be used, but the extent of carboxymethylation required in any particular instance will depend upon the final properties desired. In general the carboxymethyl protein contain about 3 to 15 percent carboxymethyl groups, depending upon the amount reacted, and to some extent upon the individual protein employed.

The exact mechanism of the reaction is not known. However, chloroacetic acid is known to react with certain functional groups which are present in protein materials. The reaction involved in this invention can, therefore, be explained as follows, where Pr represents the protein molecule less the functional groups shown:

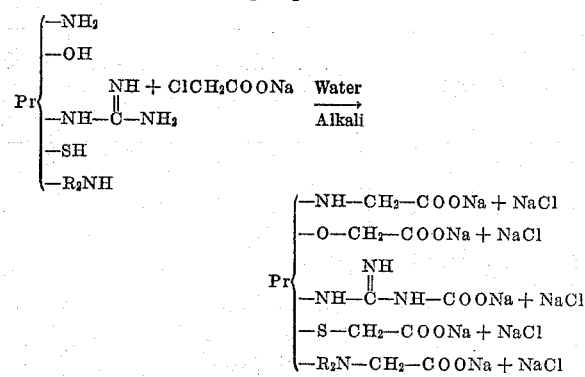

Apparently the amount of chloroacetic acid reacting with the protein material is governed by the number of reactive functional groups present. According to our findings, any protein containing these functional groups can be carboxymethylated. Data from Examples 1 and 2, below, show that primary amino groups are involved, for example, yet these primary amino groups would account for but 0.037 mole of carboxymethyl groups per 100 grams of carboxymethyl protein. This is much less than one third of the 0.124 to 0.156 mole of carboxymethyl groups found in the product. The hydroxyl groups of constituent amino acids of soybean protein, serine, threonine and tyrosine would account for only about 0.115 additional mole of carboxymethyl groups even if completely reacted. Therefore, the functional groups shown in the equation are probably all involved in the reaction.

Although we prefer the use of chloroacetic acid as a carboxymethylating agent because of its economical advantage, other reagents such as, for example, bromoacetic acid may be employed.

Our invention is more specifically illustrated by the following examples:

*Example 1*

One hundred grams of lime-extracted soybean protein, containing 15.54 percent nitrogen (dry basis) and 8.14 percent moisture and having a sedimentation constant ($S_{20}$) of 2.40, was dispersed in 700 ml. of water containing 4 grams of sodium hydroxide. The pH of the dispersion was 11.0. A second solution was prepared by dissolving 21.6 grams (0.224 mole) of chloroacetic acid in 50 ml. of water and neutralizing with 8.96 grams (0.224 mole) of sodium hydroxide dissolved in 50 ml. of water. The solutions were kept cold during the neutralization step to prevent hydrolysis of the chloroacetate group to glycollate. The solution of sodium chloroacetate was then added, with stirring to the protein dispersion and the temperature raised to 50° C. by a steam bath. The pH of the reaction mixture was maintained at 10 to 11 by the periodic addition of 3.37 normal sodium hydroxide. The reaction was continued for 10.5 hours during which time 6.0 grams (0.15 mole) of alkali was used to neutralize hydrogen chloride liberated from the reaction.

The pH of the reaction mixture was then adjusted to 3.1 by the addition of hydrochloric acid. The precipitated curd was removed by centrifugation, re-suspended in distilled water, and re-centrifuged twice to remove salt, and dried in an air-draft oven at 50° C. The yield of crude product was 90 grams.

Twenty grams of the crude carboxymethyl protein was dispersed in water at pH 6.6 with sodium hydroxide and dialyzed three days against distilled water in order to remove occluded salts. The yield was 18 grams. The total nitrogen content (dry basis) was 14.11 percent which indicates a carboxymethyl content of 9.2 percent (0.156 mole per 100 g. protein) when compared with the nitrogen content (15.54 percent) of the starting protein. This figure for the carboxymethyl content checks with the amount of sodium hydroxide (0.15 mole) used to maintain a constant pH during the reaction. The primary amino nitrogen content (Van Slyke method) of the carboxymethyl protein was 0.1 percent compared with 0.6 percent for the starting protein. The sedimentation constant ($S_{20}$) as determined by the ultracentrifuge was 2.59 and only one peak was observed. Further evidence that carboxyl groups were added to the protein results from the amount of alkali required to titrate the product to pH 9.5. For the carboxymethyl protein, 0.12 mole of sodium hydroxide per 100 grams was required while only 0.07 mole of alkali was required for the starting protein.

Formaldehyde was added to a 20 percent dispersion of the carboxymethyl protein of the above example, and no gelation was observed over a period of one week, while a similar dispersion of the unreacted protein gelled immediately. An ammonical dispersion of carboxymethyl protein in an open test tube was allowed to stand in the laboratory for 3 months without any sign of putrefaction, while the unreacted protein became putrid within 48 hours.

*Example 2*

Three hundred grams of commercial soybean protein with a nitrogen content of 15.0 percent (dry basis) and which gave two peaks by ultracentrifuge analysis, 60 percent with a sedimentation constant ($S_{20}$) of 3.93 and 40 percent with $S_{20}$ of 1.10, was dissolved in two liters of water containing 12 grams of sodium hydroxide to give a dispersion of pH 10 to 11. An aqueous solution (150 ml.) containing 53.2 grams (0.5625 mole) of chloroacetic acid and an equivalent amount of sodium hydroxide (22.5 grams) was prepared as in Example 1. The two solutions were mixed and the temperature adjusted to 70° C. while stirring. The pH was maintained at 10 to 11 by the addition of 9.37 normal sodium hydroxide. The reaction was carried out for 6 hours during which time 17.28 grams (0.417 mole) of sodium hydroxide was consumed in neutralizing hydrogen chloride liberated from the reaction of sodium chloroacetate with the protein.

The pH of the hot reaction mixture was adjusted to 3.0 by the addition of concentrated hydrochloric acid. The precipitated curd was centrifuged, re-suspended in distilled water and re-centrifuged twice to remove salts. The dewatered curd was dried in an air-draft oven at 50° C. for a yield of 258 grams.

Twenty-five grams of the crude carboxymethyl protein was dispersed in water at pH 7 and dialyzed for 3 days against distilled water to remove occluded salts, and 22 grams of purified product was obtained.

A blank was run on the starting protein on which the same heat treatment was given as on the reaction product except that sodium chloroacetate was not present. The pH of the blank was 10.5 and no addition of alkali was required to maintain this pH above 10.0. Also a blank was run with sodium chloroacetate under the same conditions to determine the extent of hydrolysis of this reagent under the conditions of the reaction.

The results of the experiment are shown in the following table:

TABLE I

| Material | Temp., °C. | Reaction time, hrs. | Moles of ClCH$_2$COONa used | Moles of NaOH used during reaction | Yield of crude product, g. | Dialysis loss, percent | Total N Percent (Dry Basis) | Van Slyke Amino N, percent | pH of Min. Soly. | Neut. Equiv. per 100 g. to pH 9.5 | $S_{20}$ |
|---|---|---|---|---|---|---|---|---|---|---|---|
| 100 g. Protein | 70 | 6 | 0.1875 | 0.139 | 86 | 12 | 13.9 | 0.07 | 3.1 | 0.17 moles NaOH. | one peak 1.35. |
| 100 g. Protein blank at pH 10.0–10.5 | 70 | 6 | 0 | 0 | 89 | 12 | 15.0 | 0.50 | 4.5 | 0.08 moles NaOH. | (starting protein) 60%=3.93 40%=1.10 |
| ClCH$_2$COONa blank at pH 10–11 | 70 | 6.5 | 0.1 | 0.02 | | | | | | | |

The carboxymethyl content calculated from difference in nitrogen content was 7.4 percent (0.124 mole per 100 g.) which compares favorably with that calculated from the amount of sodium hydroxide used up during the reaction (8.1 percent or 0.137 mole per 100 g.). The neutral equivalent is not an absolute value as reported in the table since it merely indicates a difference in the amount of alkali taken up over the same pH range. The neutral equivalent does indicate a doubling of acid groups over this range.

When formaldehyde was added to an alkaline dispersion of this carboxymethyl protein, no gelation was observed over a period of three months, indicating the primary amino groups were substantially blocked off. An ammoniacal dispersion placed in an open beaker in the laboratory was allowed to stand for three months with periodic addition of water to compensate for evaporation without noting any putrefaction, although the appearance of mold colonies was noted after about two months. The pH at the end of three months was 6.0.

A clear aqueous dispersion of 10 percent concentration was obtained with the carboxymethyl protein at pH 5.5 while the blank protein required a pH of 7.5 to 8.0.

In order to determine whether or not the presence of unreacted chloroacetic acid was preventing putrefaction, a 50–50 mixture of carboxymethyl protein and of unreacted protein was dispersed in alkali and allowed to stand in an open beaker. The mixture became putrid within 3 days. In another test untreated protein was mixed with sodium chloroacetate, and the mixture deteriorated, the presence of the sodium chloroacetate exhibiting substantially no preservative effect.

The following examples illustrate the use of our novel carboxymethyl protein in emulsion paints. It is to be understood that these examples are not limiting inasmuch as a wide variety of emulsions may be formulated employing our products as emulsion stabilizers.

In general, we employ about 1 to 30 percent of the stabilizer, based on the weight of the emulsified substances. More or less may be used, as is the case of unmodified protein previously used.

*Example 3*

A 15 percent aqueous dispersion of carboxymethyl (CBM) protein from Example 2 was prepared by adjusting the pH to 8.0 with 28 percent ammonia. This dispersion was used as an emulsion stabilizer in preparing emulsion paint with the following formulation:

| No. | Ingredient | Grams | Percent by wt. |
|---|---|---|---|
| 1 | 15% CBM protein soln | 31.3 | 8.76 |
| 2 | 50% ethanol soln. of monoethanolamine oleate | 3.6 | 1.08 |
| 3 | Tributyl phosphate | 3.0 | 0.84 |
| 4 | Igepol C. A. (an alkylphenyl ether of polyethylene glycol) Extra high conc. | 1.9 | 0.53 |
| 5 | Latex, Dow 512-K (48%) | 131.3 | 36.72 |
| 6 | Titanium Dioxide, Rutile 300 | 87.1 | 24.35 |
| 7 | Lithopone | 21.0 | 5.88 |
| 8 | Celite, J. M. 281 (a magnesium silicate pigment) | 8.7 | 2.43 |
| 9 | Water | 69.2 | 19.37 |
| 10 | 6% Cobalt Naphthenate | 0.5 | 0.04 |
|   |   | 357.6 | 100.00 |

Ingredients 1 through 4 were mixed together and then the latex was added with stirring. The pigments were stirred in to form a paste which was compounded on a paint roller mill. The paste was then thinned with water and item No. 10 added. This paint had a viscosity of 90 centipoises compared to 70 for a blank paint prepared with the blank protein of Example 2. The paint was inoculated from a freshly putrefied protein solution, bottled, and allowed to stand in the laboratory. At the end of three months, there was no change in viscosity and no sign of putrefaction.

Ingredient, Dow 512-K, is a colloidal dispersion of a styrene-butadiene copolymer in water. The latex particles in the dispersion have an average diameter of 0.2 micron.

A sample of the protein dispersion used in this paint was also inoculated with putrid protein and allowed to stand in an open beaker for three months without any sign of putrefaction.

*Example 4*

A latex emulsion paint was prepared by the same formulation as in Example 3 except that a protein emulsion stabilizer dispersion prepared as follows was used:

15.0 g. carboxymethyl protein
2.0 g. 28 percent ammonia
0.75 g. Formalin
82.75 g. water.

The paint had a viscosity of 100 centipoises compared to 70 centipoises for a paint in which the blank protein of Example 2 was used. The paint was then inoculated from a freshly putrefied protein solution as in Example 3. No change in viscosity was observed on storing the paint for three months in the laboratory. A sample of the carboxymethyl protein dispersion containing Formalin was also inoculated with putrefied protein and allowed to stand in an open beaker in the laboratory for three months without exhibiting any putrefaction.

We claim:

A butadiene-styrene latex emulsion paint containing as an emulsion stabilizer from 1 to 30 percent of carboxymethyl protein which contains 3 to 15 percent carboxymethyl groups based on the weight of the protein.

References Cited in the file of this patent

UNITED STATES PATENTS

| 2,188,167 | Whitehead | Jan. 23, 1940 |
| 2,363,892 | Monier | Nov. 28, 1944 |
| 2,398,317 | MacKenzie et al. | Apr. 9, 1946 |
| 2,636,829 | Smith et al. | Apr. 28, 1953 |
| 2,719,837 | Biddison | Oct. 4, 1955 |

OTHER REFERENCES

Anson et al.: J. Gen. Physiol L3, pages 469–476 (1929–30).

Rapkine, Compt. Rendu. 112, pages 1294–97 (1933).

Pillemer et al.: J. Exptl. Med. 70, pages 387–97 (1939).

Anson et al.: "Advances in Protein Chem.," vol. III, pages 185–6 (1947).

Michaelis et al.: J. Biol. Chem. vol. 106, pages 331–341 (1934).

Rosner, J. Biol. Chem., vol. 132, pages 657–661 (1940).